United States Patent Office 3,799,901
Patented Mar. 26, 1974

3,799,901
PREPARATION OF LATEXES BY DIRECT DISPERSION OF ACIDIC ORGANIC POLYMERS INTO AQUEOUS ALKALINE MEDIA
Gordon D. McCann and Earl L. Dumitru, Midland, and James B. Louch, Coleman, Mich., assignors to The Dow Chemical Company, Midland, Mich.
No Drawing. Continuation of abandoned application Ser. No. 741,903, July 2, 1968. This application Mar. 12, 1971, Ser. No. 123,888
Int. Cl. C08f 47/16, 47/18
U.S. Cl. 260—29.6 PM                18 Claims

ABSTRACT OF THE DISCLOSURE

Synthetic latexes and aqueous colloidal dispersions, free of added external surfactants and emulsifiers, are made from normally solid, water- and alkali-insoluble thermoplastic oragnic addition polymers containing plurality of acid groups in the polymer structure and which are in non-colloidal massive form by digesting the polymer in admixture with an enveloping alkaline aqueous liquid medium until the polymer spontaneously converts into colloidal particles in the aqueous medium. In an example, a solid thermoplastic ternary copolymer of ethylene, 11.2% by weight ethyl acrylate, and 11% by weight acrylic acid, in the form of molding granules, was converted to latex form by digestion in aqueous ammonia or in aqueous potassium hydroxide. The resulting dispersions are useful in impregnating, coating and adhesive compositions.

BACKGROUND OF THE INVENTION

This application is a continuation of Ser. No. 741,903, filed July 2, 1968, and now abandoned.

This invention relates to a method for making syntheic latexes from organic polymers in massive form, more particularly from addition polymers containing acid groups in their molecular structure.

Various synthetic organic polymers such as polymers of ethylene, of styrene, of acrylic esters, and of vinyl esters are known to be useful as, and in the preparation of, adhesives, coatings, laminations and the like. While they can be applied in many ways, it is often desirable to apply such polymers in the form of aqueous colloidal dispersions of the kind commonly called latexes. However, many polymers are made by polymerizing a monomer system en masse, or in non-aqueous solvent, or in non-colloidal suspension in a fluid suspending medium. Consequently, the art desiring an aqueous latex form of these polymers has resorted to making colloidal dispersions of the mass polymers in aqueous media using water-soluble surfactants and emulsifiers such as soap, etc., with or without the aid of organic solvents that are subsequently removed, using various colloid mills, homogenizers and the like. Although such resulting latexes may have some utility, the presence therein of the water-soluble surfactants and emulsifiers is sometimes disadvantageous in that such materials are generally incompatible with the dispersed polymer and interfere with the formation of coherent coatings. Moreover, these residual water-soluble or hydrophilic materials have a deleterious effect on the strength, toughness and water sensitivity of the dried film or coating and usually impair the adhesive bond between the polymer layer and an adjacent surface.

SUMMARY OF THE INVENTION

In accordance with the present invention, certain synthetic organic polymers in massive form are converted easily into aqueous colloidal solid dispersions, i.e. aqueous latex form, without the use of added external surfactants or emulsifier agents. Consequently, the resulting latex products are emulsifier-free and can be used advantageously as such or with the subsequent further addition of surfactants or other agents of kinds and amounts desired by the artisan for his particular purpose.

In general and as more particularly desicrebd hereinafter, the present invention is an improved method for making aqueous colloidal dispersions from organic addition polymers containing a plurality of acid groups in the polymeric molecular structure thereof carried out by digesting a non-colloidal mass of the polymer with an alkaline aqueous liquid medium as a continuous enveloping phase whereby the polymer spontaneously converts into colloidal particles in the aqueous medium.

DETAILED DESCRIPTION AND EMBODIMENTS

In accordance with this invention, normally solid, water- and alkali-insoluble thermoplastic organic addition polymers containing a plurality of carboxylic acid groups in the polymeric structure thereof are converted from non-colloidal massive forms into synthetic latexes and aqueous colloidal dispersions without the use of emulsifiers by digesting a non-colloidal mass of the polymer in admixture with a continuous enveloping phase of alkaline aqueous liquid medium (preferably an amonut thereof at least equal to the amount of polymer, on a volume basis), the alkaline medium containing a base at least as basic as ammonia, such as ammonia, organic amines, and alkali hydroxides, by heating the admixture until the polymer mass spontaneously converts to colloidal particles in the aqueous medium.

The polymers contemplated for use in accordance with this invention and illustrated in the examples that follow are organic addition polymers characterized in general in being materials that are normally solid (i.e. per se solid at normal room temperature), normally insoluble in water and in aqueous alkali (i.e. substantially insoluble both in the acid form and in neutral salt form in liquid water at normal room temperature in the absence of mutual solvents), and thermoplastic (i.e. capable of being reversibly softened by heat and hardened by cooling and moldable at temperatures below their decomposition temperature). The macro-molecules of the addition polymer can be of any chemical structure provided that the massive material has the general physical properties just mentioned and further provided that the molecular structure contains a plurality of carboxylic acid groups. By "acid group" is meant a group capable of neutralization by aqueous alkali to form a water-ionizable salt, including the carboxy (—$CO_2H$) and the carboxylic acid anhydride groups which react with aqueous alkali to form water ionizable salt groups. The bulk of the polymeric macromolecular structure to which the acid group is attached can be of any chemical structure provided (as stated above) the material has the required general physical properties and is chemically stable to conditions of treatment with aqueous alkali whereby the acid groups are neutralized. It will be understood that the requirement that the polymer be thermoplastic precludes any extensive degree of covalent bond cross-linking in the polymer molecular structure, although the macromolecular chains may otherwise be linear, or branched, or lightly cross-linked or associated by intermolecular forces such as by crystallization, hydrogen bonding, or ionic linkages.

It will be understood that the occurrence of acid groups in the dispersible polymer should be general through the macromolecules thereof. That is to say, only those macromolecules which contain a substantial number of active acid groups can be expected to respond to the action of the aqueous base to make a colloidal dispersion in accordance with this invention. It is not necessary that all macromolecules in a given mass of polymer contain the same number of, or proportion of, acid groups, and in some instances the process effects a separation of dispersible material from non-dispersible material.

It will also be understood that it is not possible to assign a specific value as a minimum required number or concentration of acid groups which will be applicable to all possible starting materials because such value is dependent on other variables such as the kind of acid group, the kind of base polymer molecule to which such groups are attached, the molecular weight of the polymer molecule, the conditions prevailing during the dispersion, etc. In general, a lower concentration of acid groups may be present in a dispersible polymer where the macromolecules also contain other kinds of polar groups than may be necessary where the macromolecules are highly non-polar except for the acid group. For purposes of illustration only and not for limitation, it might be mentioned that a random copolymer of ethylene and acrylic acid made by copolymerization of a mixture of ethylene and acrylic acid and having for each carboxylic acid group an average of about 25 carbon atoms in the macromolecules and a standard melt flow value [1] (ASTM D–1238) of about 5 g./10 min. at 190° C. under 2160 grams load is readily dispersible into latex-like aqueous colloidal dispersions as described herein.

Similarly it is not possible to assign a specific upper limit to the number or proportion of acid groups that might be present in the macromolecules of dispersible polymers since this also is a function of other factors in the polymers. In general the upper limits of acid groups in a given polymer is, for the present purposes, fixed by the requirement that the polymer be substantially insoluble in water at room temperature, both in the acid form and in the neutral salt form, because water-soluble acid or salt polymers will form solutions in aqueous alkaline media rather than forming latexes as the term is recognized in the art.

As indicated hereinbefore, the starting normally solid water-insoluble thermoplastic organic acid addition polymers can be of any chemical structure provided that they have the physical properties and acid characteristics described. Typical acid polymers are addition polymers of ethylenically unsaturated monomers where the starting monomers include one having an acid group of the kind specified. For example, suitable polymers are the random copolymerization products of copolymerization of mixtures of one or more polymerizable ethylenically unsaturated carboxylic acids such as acrylic acid. methacrylic acid, maleic acid and anhydride, itaconic acid, fumaric acid, citraconic acid and anhydride, methyl hydrogen maleate, and the like, and one or more non-acid polymerizable monomers, such as ethylene, propylene, butene-1, 1,3-butadiene, and other aliphatic olefins; styrene, α-methylstyrene, vinyltoluene, chlorostyrene, and other aromatic olefins; ethyl acrylate, methyl methacrylate, vinyl acetate and other unsaturated esters; vinyl and vinylidene chloride; vinyl ethers; acrylamide; acrylonitrile; and the like. Particularly suitable copolymers include:

(1) Copolymers of ethylene and from about 8 to about 30% by weight of one or more ethylenically unsaturated acids such as acrylic acid, methacrylic acid, methyl hydrogen maleate, etc. as above recited;

(2) Copolymers of ethylene, fro mabout 8 to about 30% by weight of one or more ethylenically unsaturated acids, and up to about 20% by weight of one or more other monomers such as ethyl acrylate, vinyl acetate, etc., as above recited;

(3) Copolymers of styrene (and/or other ar-vinylaromatic compounds) and from about 8 to about 30% by weight of one or more ethylenically unsaturated acids such as acrylic acid, maleic anhydride, etc., as above recited.

Other polymers are made from preformed and non-acid polymers by subsequent chemical reaction carried out thereon. For example, the carboxylic acid group may be supplied by grafting a monomer such as acrylic acid or maleic anhydride onto a polymer substrate; carboxylic anhydride, ester, amide, acyl halide, and nitrile groups can be hydrolyzed to carboxylic acid groups.

Specific examples and illustrations of representative organic acid copolymers, given for purpose of illuminating the description and not to limit the scope of the invention are:

Ethylene/acrylic acid copolymers, ethylene/methacrylic acid copolymers, ethylene/itaconic acid copolymers, ethylene/methyl hydrogen maleate copolymers, ethylene/maleic acid copolymers, ethylene/acrylic acid/methyl methacrylate (ternary) copolymers, ethylene/acrylic acid/ethyl acrylate copolymers, ethylene/methacrylic acid/ethyl acrylate copolymers, ethylene/itaconic acid/methyl methacrylate copolymers, ethylene/methyl hydrogen maleate/ethyl acrylate copolymers, ethylene/acrylic acid/vinyl acetate copolymers, ethylene/methacrylic acid/vinyl acetate copolymers, ethylene/acrylic acid/vinyl alcohol copolymers, ethylene/propylene/acrylic acid copolymers, ethylene/acrylamide/acrylic acid copolymers, ethylene/styrene/acrylic acid copolymers, ethylene/methacrylic acid/acrylonitrile copolymers, ethylene/fumaric acid/vinyl methyl ether copolymers, ethylene/vinyl chloride/acrylic acid copolymers, ethylene/vinylidene chloride/acrylic acid copolymers, polyethylene/acrylic acid graft copolymers, polyethylene/methacrylic acid graft copolymers, polymerized ethylene/propylene/acrylic acid graft copolymers, styrene/acrylic acid copolymers, styrene/methacrylic acid copolymers, styrene/itaconic acid copolymers, styrene/methyl methacrylate/acrylic acid copolymers, styrene/maleic anhydride copolymers, styrene/citraconic anhydride copolymers, ar-chlorostyrene/acrylic acid copolymers, ar-t-butylstyrene/acrylic acid copolymers, methyl methacrylate/isobutyl acrylate/acrylic acid copolymers.

Specific procedures and means for making polymers are known to the art and do not constitute the essence of the present invention. While particular polymers are used in the description of the invention for purposes of illustrating the same, it will be understood that other polymers may be used. The suitability of any polymer for the present purposes can be readily ascertained by a few preliminary tests following the present description; this is particularly advantageous when the starting polymeric material is of unknown composition or history and it is not possible to ascertain its exact chemical structure.

The process of this invention is carried out by digesting a non-colloidal mass of the polymer with an alkaline aqueous liquid medium as a continuous enveloping phase. The non-colloidal mass usually comprises the common granular form of moldable resin materials but can be any form of chip, bit or piece of material resulting from chopping or grinding, or molded bead, pill, pellet or other piece,

---

[1] Unless otherwise specified herein, the expression "melt flow value" will signify the flow rate value obtained with the extrusion plastometer in accordance with the test described in ASTM D–1238–65T at 190° C. and under 2160 grams load (Condition E).

The base in the alkaline aqueous medium used in making the dispersion is any base which in water solution is at least as basic as ammonia, e.g. any one or mixture of the alkali metal hydroxides such as lithium hydroxide, sodium hydroxide, potassium hydroxide, rubidium hydroxide and cesium hydroxide, and the nitrogenous bases such as ammonium hydroxide and water-soluble strong base organic amines such as mono-, di-, and tri-methylamine, -ethylamine, -isopropylamine, and -isobutylamine, cyclohexylamine, etc., which form ionizable salts with the acid groups in the polymer, tetramethylammonium hydroxide, and the like.

The concentration of the alkali base in the aqueous medium is a function of the concentration of the acid group in the starting polymer and the amount of such polymer to be dispersed in the aqueous medium. Usually the amount of alkali corresponds to at least 0.2 equivalent per acid group in the polymer, preferably from about 0.5 to about 1 equivalent of alkali per equivalent of acid group in the polymer when the alkali is an alkali metal hydroxide, larger amounts being preferred when weaker bases are used. When the polymer is dispersed in ammonium hydroxide in a vessel having a substantial vapor space above the liquid level, as in a conventional kettle, the amount of the ammonia charged is greater, e.g. from 5 to 10, sometimes in the order of 20 or more equivalents per acid group, to obtain rapid dispersion. In some instances, a very high proportionate amount of ammonia may reduce the minimum temperature necessary to effect dispersion. It appears that ammonia and volatile amines tend to volatilize from the liquid phase and concentrate in the vapor space, especially at higher temperatures; in any event, more is required in the charge at higher temperatures in order to be effective in the aqueous medium containing the solid polymer. When the starting acid polymer contains a carboxylic acid anhydride as the acid group, such group is counted as two equivalents of acid group for purpose of computing the number of equivalents of base required for neutralization.

The amount of aqueous medium relative to the amount of starting polymer is selected so that the aqueous liquid medium surrounds and envelopes the polymeric particles, and so that the resulting latex product has the desired concentration of polymeric material. Usually, the amount of aqueous medium is at least equal in volume to the starting polymer and may be as much larger as desired to make more dilute latexes. Generally, from about 1 to about 20 parts by weight of aqueous medium is charged per part by weight of starting polymer, preferably so that the polymer is from about 5 to about 40 percent by weight of the combined polymer and aqueous medium. Of course, a concentrated latex product can be subsequently diluted and a dilute latex product can be subsequently concentrated by known means.

The digestion step is carried out by simply holding together the starting polymer and aqueous alkaline liquid medium, conveniently in a vessel such as a kettle adapted for holding the contents in the solid/liquid state under autogeneous pressure when volatile bases and/or higher temperatures are used. The digestion can also be carried out in an elongated pipeline vessel, it being necessary only to provide good contact and exposure of the polymer pieces to the enveloping aqueous alkaline liquid medium and to provide heat if necessary or desired. It is not necessary to use vigorous agitation or particle reduction of the nature provided by colloid mills and homogenizers. In fact, spontaneous dispersion and peptization is obtained in static experiments. Hence agitation is not a required feature, but merely an aid to promote speedier conversion and better heat transfer. The digestion process is accelerated by heat. Usually temperatures of about 90° C. and above are employed. Faster latex conversions are usually obtained with higher temperatures up to about 140–160° C., provided the polymers are thermally stable up to such temperatures. Still higher temperatures, e.g. to about 180° C. and up to the decomposition temperature, can be used, but without significant advantage. In some instances, acid polymers colloidally disperse in aqueous alkaline media at temperatures down to about room temperature but longer times may be required.

The resulting digestion mixture consists of, or comprises, a latex-like colloidal dispersion of the polymer as submicronic particles in the aqueous medium. In some instances a portion of the starting polymer material may remain undispersed, or may have agglomerated by fusing together, but such non-colloidal material is readily separated, e.g. by settling and decantation or by filtering from the latex product.

The latex products so provided consist essentially of the polymer, water, and alkali, the polymer being dispersed as colloidal particles in the order of 200–5000 angstrom units, the latex having a pH of 7 and above, generally from about 8 to about 11. The concentration of polymer in the latex usually is in the order of from about 5 to about 40 percent by weight. Because they are free of external emulsifiers, latexes are obtainable by this process which are relatively low foaming, i.e. they form little foam on vigorous shaking or stirring, and the foam that does form readily collapses on quiet standing. They are also very stable in that they do not readily coagulate on stirring or on the addition of moderate amounts of ionic or non-ionic water-soluble solutes which do not lower the pH below the neutral point. Latexes of carboxylic acid polymers are coagulated by acidification, unless they are stabilized by added emulsifiers that are functional in acid media.

The resulting latex products are useful as, and in the preparation of, material for coating, impregnating, and treating substrates, for adhesives in the making of laminates, in the formulation of paint and ink compositions, and for casting of film. Other materials can be admixed with the latexes such as pigment, inert fillers, colorants, other polymer latexes, and reagents reactive with the acid polymers; water soluble surfactants can also be added if desired.

Other characteristics, features and details of the process of the present invention and the latex products thereof are shown in the following examples which illustrate the invention but are not to be taken as limiting the same. Unless otherwise indicated, parts and percentages are by weight. All of the polymers used in these examples were normally solid, water- and alkali-insoluble thermoplastic polymer resins made by conventional means known in the art.

Where, in the examples, a "melt flow value" of the polymer is given, this melt flow value is a measure of the flow properties of the thermoplastic material is obtained in the apparatus and by the general procedure described in the ASTM method designation D1238–65T. All of the values reported herein were obtained by operating the ASTM described dead weight piston plastometer (melt indexer) at 190° C. Depending on the ease of extrusion of the particular sample, the test was carried out with one of the two standard weights placed on the piston such that the total combined load of the piston and added weight was either 325 grams (Condition D) or 2160 grams (Condition E). In the manner described in ASTM D1238–65T, cutoffs of the extended portion at one minute intervals were collected and weighed. In the case of tests using the small weight (325 gram load) the average weight in grams of material extruded in the one minute intervals was multiplied by 100 to compute the hypothetical average weight in grams that would be extruded per 100 minutes. In the case of tests using the large weight (2160 gram load) the average weight in grams of material extruded in the one minute intervals was multiplied by 10 to compute the hypothetical average weight in grams that would be extruded per 10 minutes.

Thus, for a material which, tested as described above at 190° C. using the 325 grams load on the dead weight piston, yielded cutoff portions at one minute intervals having average weight of 0.2 gram, the results would be reported in the following examples as a melt flow value of 20 grams per 100 minutes at 190° C. under 325 grams load. Similarly, for a material which, tested at 190° C. using the 2160 grams load, yielded one minute cutoffs averaging 0.5 gram, the results would here be reported as a melt flow value of 5 grams per 10 minutes (at 190° C. under 2160 grams load).

EXAMPLE 1

A series of runs was made in a 6-liter reactor equipped for stirring the contents and for heating the same via a jacket around the vessel which was capable of withstanding autogenous pressure. Details of the runs are tabulated in Table I. In general the runs were carried out by charging aqueous alkali, of kinds and amounts as indicated, water and 1000 grams of the polymer to the reactor and heating the resulting mixture with stirring at the temperatures and for the times shown. All of the starting polymers were solid thermoplastic products obtained in a commercial process by copolymerizing the indicated monomers in a mixture thereof under conditions conducive to polymerization of ethylene and were charged in the form of granules. The results of the runs are described in the remarks following Table I.

concentration of ammonia in the starting aqueous charge; thus the ratio of ammonia to polymer acid equivalent in the system was varied. Visual observations were made from time to time and the extent of the conversion of terpolymer pellets to latex was estimated.

It was observed that complete conversion of the starting copolymer pellets to latex was obtained, in general, in shorter time at higher temperatures with higher ammonia concentrations. At lower ammonia concentrations, the conversions were faster at lower temperature. Representative data of time, temperature and ammonia concentration are shown in Table II. The equivalents of ammonia are equivalents of base in the starting aqueous ammonia per equivalent of acid group in the starting copolymer.

TABLE II

Time in hours for complete conversion to latex of starting terpolymer in aqueous ammonia

| Equivalents of ammonia | Time for complete digestion at— | | | |
|---|---|---|---|---|
|  | 100° C. | 140° C. | 160° C. | 180° C. |
| 9 |  | 21.0 |  (None in 20 hours) | (a) |
| 18 | 1.5 | 90.0 | (Slight in 20 hrs.) | (a) |
| 28 | 0.83 | 1.0 | (30% conv., 20 hrs.) | (a) |
| 37 | 0.67 | 1.0 | (95% conv., 20 hrs.) | (a) |
| 46 | 0.67 | 0.5 | 0.5 | (a) |
| 55 | 0.67 | 0.5 | 0.33 | (a) |
| 65 | 0.67 | 0.5 | 0.33 | (a) | a Incomplete conversion in 24 hours.

TABLE I

| Run number | Ethylene polymer composition [1] | Alkali | | Added water, g. | Conditions | | |
|---|---|---|---|---|---|---|---|
|  |  | Kind | Weight |  | Time, hrs. | Temp., ° C. | Press., p.s.i. |
| 1 | 11.0 EA/11.2 AA | NH₃ | 1,500 g. 28% solution | 1,500 | 17 | 130 | 65 |
| 2 | 11.0 EA/11.2 AA | KOH | 87 g. pellets | 3,000 | 4 | 115–140 | 40 |
| 3 | 11.0 EA/11.2 AA | NH₃ | 1,500 g. 28% solution | 1,500 | 4 | 120 | 65 |
| 4 | 11.0 EA/11.2 AA | NH₃ | do | 1,500 | 3.5 | 120 | 70 |
| 5 | 11.0 EA/11.2 AA | NH₃ | do | 1,500 | 4.5 | 120 | 75 |
| 6 | 15.6 AA | NH₃ | do | 1,500 | 21 | 120 | 75 |
| 7 | 15.6 AA | NH₃ | do | 1,500 | 21 | 130 | 75 |
| 8 | 11.2 AA | NH₃ | do | 1,500 | 22 | 130 | 65 |

[1] Runs 1–5, ternary copolymers of 77.8% ethylene, 11.0% ethyl acrylate, and 11.2% acrylic acid, melt flow value of 7.06 grams per 10 minutes.
Runs 6–7, binary copolymer of 84.4% ethylene and 15.6% acrylic acid, melt flow value of 50.3 grams per 100 minutes at 190° C. under 325 grams load.
Run 8, binary copolymer of 88.8% ethylene and 11.2% acrylic acid, melt flow value of 8.5 grams per 10 minutes.
REMARKS.—Good latex products were obtained in each case. The products of Runs 6 and 7 were particularly excellent latexes, having low viscosity. The product of Run 8 was a white latex containing some separable flocculent material.

EXAMPLE 2

To a 12-oz. small-mouthed bottle was charged 40 g. of granules of a solid binary copolymer of 86% ethylene and 14% acrylic acid and 100 g. of aqueous ammonia 14%. The vessel was closed with a crown-cap and tumbled in a heating bath at 120° C. for 16 hours, then removed and cooled. The resulting product was a smooth stable latex containing the polymer colloidally dispersed in the aqueous medium.

EXAMPLE 3

A series of tests was carried out on the dispersion into latex form in aqueous ammonia of a starting ternary copolymer of ethylene, ethyl acrylate and acrylic acid. The terpolymer was a solid thermoplastic having a melt flow value of 7.06 g./10 min. and had been made in commercial manner by copolymerizing a mixture of the monomers under conditions of high temperature, high pressure and presence of free-radical catalyst conducive to polymerization of ethylene, and contained approximately 77.8% ethylene, 11.2% ethyl acrylate, and 11% acrylic acid. It was in the form of small cylindrical pellets about 0.5 cm. diameter x 0.5 cm. long.

In this series, one gram-portions of the terpolymer and 12 gram-portions of aqueous ammonia were charged to 20-cc. glass ampoules in an apparatus equipped for heating and cooling and tumbling the ampoule and its contents by rotating the same end-over-end at about 3 r.p.m. The tests runs were varied as to temperature, being carried out at 100°, 140° and 160° C., and as to the

EXAMPLE 4

A series of tests was carried out in the apparatus and manner described in Example 3 and with the same kind of starting ternary copolymer but using aqueous potassium hydroxide in the medium for dispersion. The test runs were varied as to the temperature, being carried out at 120°, 140° and 160° C., and as to the concentration of KOH in the starting aqueous charge, thereby varying the ratio of equivalents of KOH to equivalent of acid polymer in the starting system. It was observed that more than about 0.55 equivalent of KOH per acid group in the starting polymer was necessary to obtain complete conversion of the solid polymer pellets to latex; below such concentration the conversion was not complete even at higher temperatures and longer times. It was further observed that no advantage in rate of conversion was obtained in runs having more than about 0.85 equivalent of KOH per acid group in the starting polymer. Within the range of 0.55–0.85 (and higher) equivalents of KOH per acid group in the starting polymer, higher temperatures effected generally faster conversion to latex, and smooth stable latexes containing the polymer colloidally dispersed in the aqueous media were obtained. Representative data are shown in Table III wherein the equivalents of KOH are equivalents thereof in the starting aqueous alkali solution per equivalent of acid group in the starting terpolymer.

TABLE III

Time in hours for complete conversion to latex of starting terpolymer in aqueous potassium hydroxide

| Equivalents of KOH | Time for complete digestion at— | | |
|---|---|---|---|
| | 120° C. | 140° C. | 160° C. |
| 0.6 | 1.67 | 1.25 | 1.1 |
| 0.7 | 1.0 | 0.6 | 0.5 |
| 0.85 | 0.75 | 0.33 | 0.25 |
| 1.0 | 0.75 | 0.33 | 0.25 |

EXAMPLE 5

A series of tests was carried out in the apparatus and manner described in Examples 3 and 4 and with the same kind of starting ternary copolymer but using aqueous sodium hydroxide as the medium for dispersion. Results similar to those noted for KOH digestion in Example 4 were obtained except that conversion rates were a little slower in the case of sodium hydroxide.

EXAMPLE 6

Into the container of a commercial kitchen-type blender, a Waring Blendor Catalogue No. 700A, were placed 200 grams of water and 50 grams of an acid polymer in the form of solid granules. The acid polymer was a binary copolymer of ethylene and acrylic acid, made by copolymerizing ethylene and acrylic acid in a mixture thereof in commercial manner under conditions conducive to polymerization of ethylene, i.e., high temperature and pressure and contact with free radical catalyst, contained about 15.3 percent acrylic acid, and had a melt flow value of approximately 50 grams per 100 minutes at 190° C. under 325 grams load. The operation of the blender was such that the energy of mechanical working result in heating the mixture nearly to the boiling point. A concentrated (42%) solution of potassium hydroxide in water was added little by little until a total of 7 mls. thereof had been added, corresponding to an amount of KOH equivalent to approximately 70 percent of the carboxylic acid groups in the copolymer. Some water was lost by steaming from the vessel.

The resulting product when cooled was a pourable aqueous emulsion or latex containing about 22.7 percent solids colloidally dispersed in the aqueous medium. There were no visible coarse solid particles remaining.

EXAMPLE 7

Into an open beaker were charged 180 g. of water, 20 g. of KOH, and 40 g. of a ternary copolymer of 73.9% ethylene, 13.7% ethyl acrylate and 12.4% acrylic acid. The starting ternary copolymer, in the form of molding pellets, had a melt flow value of 16.4 grams per 100 minutes at 190° C. under 325 grams load. After the mixture had stood at 70° C. for 30 minutes, there was added sufficient 10% KOH solution in water to reduce the polymer concentration to about 7% of the total mixture. The resulting mixture was heated to 90° C. and subjected to the vibrations of an ultrasonic generator (Branson, Model S-75) for 15 minutes. There was thereby obtained a stable colloidal dispersion or latex of the starting polymer.

In the foregoing Examples 6 and 7, the procedures included the use of high shear agitation. However, such conditions of agitation are merely incidental in the described examples, wherein the dispersion of the starting massive polymer into colloidal state is actually a spontaneous dispersion consequential to the kind of polymer, the kind of aqueous base, and the temperature. The fact that agitation is not a required condition is demonstrated in the following Example 8 wherein no mechanical agitation of any kind is used, i.e. the procedure is carried out under static conditions.

EXAMPLE 8

Into separate 20-cc. glass ampoules were placed 1 gram of polymer in the form of molding granules or pellets and 12 grams of aqueous 14% ammonia. The ampoules were sealed and placed in a constant temperature bath and held at 140° C. without agitation. The polymers used were solid thermoplastic random copolymers of ethylene and comonomers as follows:

(a) binary copolymer of ethylene and 20.4% acrylic acid having melt flow value of 21.6 grams per 100 minutes at 190° C. under 325 grams load;
(b) ternary copolymer of ethylene, 11.2% ethyl acrylate, and 11.0% acrylic acid having melt flow value of 7.06 grams per 10 minutes;
(c) binary copolymer of ethylene and 15.3% acrylic acid having melt flow value of 50 grams per 100 minutes at 190° C. under 325 grams load.

After 45 minutes, polymer (a) was completely dispersed to a colloidal latex. After one hour, polymer (b) was nearly completely dispersed, and dispersion of (c) had begun but appeared to be slower than (b). When next observed after 16 hours, both (b) and (c) had completely dispersed to colloidal latexes.

EXAMPLE 9

While, as shown in Example 8, agitation is not necessary to effect dispersion of massive copolymers of the kind specified into form of aqueous latex, agitation does affect the rate of conversion, as shown by the example.

Test (b) of Example 8 was repeated in all respects except that the sealed ampoule was mounted on a shaft turning slowly in the heating bath so that the ampoule was turned about its midpoint in an end-over-end tumbling fashion at about 3 revolutions per minute. After 30 minutes the dispersion was complete to a colloidal latex.

EXAMPLE 10

A series of tests was carried out in the apparatus and manner described in Example 3 but with a starting binary copolymer of ethylene and acrylic acid. The copolymer was a solid thermoplastic containing 14.7% acrylic acid and 85.3% ethylene, and having a melt flow value of 20.9 grams per 100 minutes at 190° C. under 325 grams load, in the form of small cylindrical pellets about 0.5 cm. diameter and 0.5 cm. long. The test runs were made at 120° C. and at 140° C. with various concentrations of ammonia in the starting aqueous media. At 120° C., starting concentrations above about 20 equivalents of ammonia per equivalent of acid copolymer were necessary to make a latex in the apparatus used, and conversions were complete within about 8 hours. The starting copolymer was completely converted to latex in about 4 hours with about 30 equivalents of ammonia per equivalent of acid copolymer in the starting system; higher concentrations of ammonia did not shorten the time for digestion of the starting copolymer to latex at 120° C. At 140° C. and concentration above about 45 equivalents of ammonia per equivalent of acid copolymer in the starting system, digestion was complete in 2-4 hours.

EXAMPLE 11

In another series of test runs carried out in the apparatus and manner described in Example 3, various polymers of ethylene were heated with stirring at 100° C. in 12 parts of 4% aqueous ammonia. The starting polymers were solid thermoplastic materials in the form of molding pellets. Complete conversions to smooth colloidal dispersions (latexes) were obtained in each of the following instances:

(A) On digestion of a ternary copolymer of 72% ethylene, 14% ethyl acrylate and 14% acrylic acid, melt flow value 8 grams per 10 minutes, after 1 hour, 50 minutes.

(B) On digestion of a ternary copolymer of 67.3% ethylene, 14.9% ethyl acrylate and 17.8% acrylic acid, melt flow value 20 grams per 100 minutes at 190° C. under 325 grams load, after one hour.

(C) On digestion of a ternary copolymer of 65.9% ethylene, 15.7% ethyl acrylate and 18.4% acrylic acid, melt flow value 7.16 grams per 10 minutes, after 50 minutes.

(D) On digestion of a binary copolymer of 79.4% ethylene and 20.6% acrylic acid, melt flow value 23.3 grams per 100 minutes at 190° C. under 325 grams load, after 25 hours.

(E) On digestion of a binary copolymer of 72.7% ethylene and 26.3% acrylic acid, melt flow value 20 grams per 10 minutes, after 2 hours, 20 minutes.

On cooling, there was obtained a white latex product having 25.4% solids, viscosity 1270 cps. and pH 10.6. There was present in the latex some filterable, non-dispersed polymer residue.

EXAMPLE 14

In a series of runs, the details of which are shown in Table V, several different polymers were digested with aqueous ammonia in a 25-gallon stainless steel reactor.

After the digestion was complete, the latex products were cooled and the digestion vessel was opened. The latexes were carefully reheated to 85° C. and the excess ammonia was evaporated from the latexes, aided by a slow stream of nitrogen until the pH of the resulting latex product was about 8.

TABLE V

| Run number | Ethylene polymer [1] Composition | Lbs. | 28% NH₃, lbs. | H₂O, lbs. | Digestion Temp., °C. | Time, hrs. | Remarks |
|---|---|---|---|---|---|---|---|
| 1 | 12.4 EA/13.7 AA | 50 | 75 | 75 | 140 | 5 | Clean latex, no floc. |
| 2 | 11.2 AA | 50 | 75 | 75 | 140 | 5 | Latex containing some floc. |
| 3 | 14 EA/14 AA | 40 | 17.5 | 143 | 100 | 5 | Clean latex, no floc. |
| 4 | 14 EA/14 AA | 40 | 17.5 | 143 | 100 | 5 | Do. |

[1] Run 1, terpolymer of 73.9% ethylene, 12.4% ethyl acrylate and 13.7% acrylic acid, melt flow value 16.4 grams per 100 minutes at 190° C under 325 grams losd.
Run 2, binary copolymer of 88.8% ethylene and 11.2% acrylic acid, melt flow value 8 grams per 10 minutes.
Runs 3 and 4, terpolymer of 72% ethylene, 14% ethyl acrylate and 14% acrylic acid, melt flow value 8 grams per 10 minutes.

EXAMPLE 12

In another series of test runs in the maner of Example 3, a starting solid thermoplastic binary copolymer of 87.3% ethylene and 12.7% acrylic acid, melt flow value of 9.66 grams per 10 minutes, in form of molding granules was digested in various amounts with various concentrations of aqueous ammonia by tumbling in a closed vessel at 120° C. The data are shown in Table IV.

At a concentration of 25% polymer in the aqueous medium with six equivalents of ammonia per acid group in the starting system, complete conversion and low viscosity pourable latex products were obtained after 30 minutes.

At concentrations of 30 to 50% polymer in the aqueous media with from 1 to about 4 equivalents of ammonia per acid group in the starting system, complete digestion was obtained in from 0.5 to 1.5 hours. Colloidal dispersions of polymer in the aqueous media were obtained which ranged from viscous liquids to paste-like material. On mixing with water, the latter were diluted to fluid latexes.

TABLE IV

| Run No. | Polymer solids, percent | No. of eq.'s NH₃ | Time | Dispersion viscosity 120° C. | 25° C. |
|---|---|---|---|---|---|
| 1 | 25 | 6.0 | 30 min | Low | Pourable. |
| 2 | 30 | 0.8 | 21 hours | Very thick | Paste-floc. |
| 3 | 30 | 1.5 | 1½ hours | Thick | Paste. |
| 4 | 30 | 2.3 | 1 hour | do | Soft paste. |
| 5 | 30 | 3.1 | 30 min | do | Do. |
| 6 | 30 | 3.9 | 30 min | do | Do. |
| 7 | 40 | 1.0 | 1 hour | Soft paste | Viscous paste. |
| 8 | 40 | 1.5 | do | do | Do. |
| 9 | 40 | 2.0 | do | do | Do. |
| 10 | 40 | 3.0 | do | do | Do. |
| 11 | 50 | 2.0 | do | Paste | Do. |

EXAMPLE 13

To a 25-gallon stainless steel reactor were charged 181 lbs. of water, 63 lbs. of polymer, 123 lbs. of potassium hydroxide, and 5.4 lbs. of 28% aqueous ammonia, with stirring. The polymer was the thermoplastic binary copolymer of 87.3% ethylene and 12.7% acrylic acid described in Example 12.

The vessel was closed and heated to 120° C. After 3 hours, an additional 5.4 lbs. of 28% aqueous ammonia was added to the mixture by injection into the vessel, and the heating and stirring were continued for an additional 4 hours.

EXAMPLE 15

A series of test runs was made by closing mixtures of various polymers in various alkaline media in 12-oz. citrate bottles which were then heated with agitation at 120° C. for 16 hours. The starting polymers were solid thermoplastic materials in conventional molding pellet form. Complete conversion thereof to smooth colloidally dispersed latexes was obtained in each of the following systems:

(A) On digestion of 20 grams of a copolymer of 85% styrene and 15% maleic anhydride in 200 grams of 10% solution of triethylamine in water.

(B) On digestion of 20 grams of a copolymer of 81.6% ethylene and 18.4% methyl acid maleate in 200 grams of 7% aqueous ammonia.

(C) On digestion of 20 grams of the copolymer of Run B in 200 grams of 3.5% aqueous ammonia.

(D) On digestion of 20 grams of a copolymer of 87% ethylene and 13% acrylic acid in 200 grams of 14% aqueous ammonia.

(E) On digestion of a binary copolymer of 88.8% ethylene and 11.2% acrylic acid in various amounts in 200 grams of 14% aqueous ammonia with results as follows:

| Polymer solids concentration, percent | Remarks |
|---|---|
| 23.0 | Fluid latex. |
| 28.5 | Do. |
| 33.3 | Do. |
| 37.5 | Viscous latex. |
| 41.1 | Very viscous latex. |

EXAMPLE 16

In this example a study was made of the particle size of the dispersed polymer in one latex system and the effect of certain procedures thereon.

A latex was prepared by digesting one part of a solid thermoplastic ternary copolymer of 72% ethylene, 14% ethyl acrylate, and 14% acrylic acid, melt flow value 8 grams per 10 minutes, in the form of molding pellets, in four parts of aqueous 3% ammonia at 100° C. for five hours. The starting polymer was completely dispersed and the resulting latex contained 20% solids and had a pH value of 10.95. An electron micrograph of a sample of this latex showed a large number of poorly defined, fluffy, apparently low density and swollen particles. The particle size in angstrom units measured by light scattering dissymmetry using monochromatic light having a wavelength in the medium equal to 3253 angstroms (blue) and 4094 angstroms (green) is shown in Table VI, Sample A.

The latex was warmed to 60° C. and, while open to the atmosphere, was stirred and a nitrogen stream was passed over the exposed surface of the latex to effect evaporation of ammonia from the latex. The pH of the resulting latex and the particle size of the dispersed polymers therein were measured from time to time as shown in Table VI.

The final latex product contained approximately 35% colloidally dispersed polymer solids and had pH 7.8 and surface tension of 69.4 dynes per cm. An electron micrograph of a sample (S) of the final latex showed that the dispersed particles had become more distinct, more spherical and apparently more dense. Most of the particles were below 1,000 angstroms in size, but the distribution of sizes was very broad. Some of the primary particles had coalesced to form larger particles.

TABLE VI

| Sample: | Hours heat treatment for removal of NH₃ | pH | Particle size, angstroms | |
|---|---|---|---|---|
| | | | Blue line | Green line |
| A | 0 | 10.95 | 975 | 1,160 |
| B | 2 | 10.80 | | |
| C | 3 | 10.72 | | |
| D | 4 | 10.66 | | |
| E | 5 | 10.40 | 845 | 1,040 |
| F | 6 | 10.33 | | |
| G | 7 | 10.20 | | |
| H | 8 | 10.00 | | |
| I | 9 | 9.70 | 840 | 1,055 |
| J | 10 | 9.45 | | |
| K | 11 | 9.05 | | |
| L | 12 | 8.80 | | |
| M | 13 | 8.50 | 870 | 1,070 |
| N | 14 | 8.25 | 1,010 | 1,305 |
| O | 15 | 8.10 | 1,280 | 1,751 |
| P | 16 | 8.00 | | |
| Q | 17 | 7.92 | 1,430 | 1,950 |
| R | 18 | 7.88 | | |
| S | 19 | 7.80 | 1,500 | 2,020 |

EXAMPLE 17

Several different solid thermoplastic binary copolymers of ethylene containing different proportions of acrylic acid or of methacrylic acid as indicated in Table VII, in granular form, were digested for 16 hours in the manner described in Example 3 at 140° C. in 12% aqueous ammonia or in aqueous potassium hydroxide containing one equivalent of KOH per acid group in the copolymer. The results as shown in Table VII which indicates the percentage of acid in the copolymer starting material and the percentage conversion of starting polymer to colloidally dispersed latex form.

TABLE VII

| Ethylene copolymer (percent) | Percent conversion of polymer to latex form | |
|---|---|---|
| | NH₃ | KOH |
| Acrylic acid: | | |
| 12.5 | 95 | 99 |
| 13.4 | 100 | 100 |
| 18.4 | 100 | 100 |
| Methacrylic acid: | | |
| 10.8 | 30 | 10 |
| 11.2 | 30 | 10 |
| 12.1 | 95 | 100 |
| 23.1 | 98 | 100 |

EXAMPLE 18

In this example a further study was made by digesting certain polymers in aqueous alkali. The starting polymers were granules of solid thermoplastic binary copolymers of styrene and acrylic acid and of substituted styrenes and acrylic acid in proportions shown in Table VIII. The starting polymers were digested for 16 hours at 140° C. in 12% aqueous ammonia or in aqueous potassium hydroxide containing one equivalent of KOH per acid group in the starting polymer. The results are shown in Table VIII which indicates the percentages of acrylic acid in the starting copolymers and the percentage conversion of the starting polymers to colloidally dispersed latex form.

TABLE VIII

| Copolymer | Conversion, percent | |
|---|---|---|
| | NH₃ | KOH |
| Styrene and acrylic acid (percent): | | |
| 10 | 50 | ¹ NR |
| 12 | 50 | NR |
| 14 | 90 | <5 |
| 16 | 90 | 40 |
| 18 | 100 | 95 |
| 20 | 100 | 100 |
| ar-Chlorostyrene and acrylic acid (percent): | | |
| 10 | 50 | 30 |
| 12 | 100 | 95 |
| 14 | 100 | 100 |
| 16 | 100 | 100 |
| 18 | 100 | NR |
| 20 | 100 | NR |
| ar-Vinyltoluene and acrylic acid (percent): | | |
| 14 | 40 | <5 |
| 16 | 80 | 90 |
| 18 | 95 | 95 |
| 20 | 100 | 100 |
| ar-t-Butylstyrene and acrylic acid (percent): | | |
| 10 | 40 | NR |
| 12 | 60 | NR |
| 14 | 100 | 10 |
| 16 | 100 | 100 |
| 18 | 100 | 100 |
| 20 | 100 | 100 |

¹ Not run.

EXAMPLE 19

Latexes were also made by digesting granules of solid thermoplastic polymers in aqueous alkali as follows:

(A) A copolymer of 30% methyl methacrylate, 66% isobutyl acrylate, and 4% acrylic acid when digested in 6% aqueous ammonia was completely converted to a colloidal latex dispersion at 120° C. and at 175° C. Digestion of the same copolymer in aqueous potassium hydroxide containing one equivalent of potassium hydroxide per equivalent of acid in the copolymer yielded a latex at 120° C. and at 175° C.

(B) Copolymers of styrene and maleic anhydride containing respectively 15.0, 20.7 and 26.0 percent maleic anhydride when digested at 140° C. in 6% aqueous ammonia were completely converted to colloidal latex dispersions. When digested at 120° C. in aqueous potassium hydroxide containing two equivalents of KOH per acid anhydride in the copolymers, the same copolymers were completely converted to aqueous latexes.

(C) Copolymers of styrene and citraconic anhydride containing 15% and 20% of the latter, respectively, when digested at 120° C. in aqueous potassium hydroxide containing two equivalents of KOH per anhydride group in the copolymer were substantially converted to latexes.

EXAMPLE 20

In a series of tests, 10-gram portions of a starting polymer in the form of molding granules were placed in 12-ounce citrate bottles together with 100-gram portions of aqueous ammonia. The bottles were capped securely and placed in a constant temperature bath (composed of water at lower temperatures and of ethylene glycol at higher temperatures) wherein the bottles were held with slow tumbling for 16 hours (overnight). The first such treatment was in a bath at 75° C., after which the bottles were removed from the bath and (without opening the bottles) the contents were visually examined. After standing during the day at room temperature, the bottles were returned to the bath, now at 80° C., for a further 16 hours of tumbling overnight. Again, the bottles were removed, the contents visually inspected, and allowed to stand at room temperature until the end of the afternoon. The sequence of tumbling overnight (16 hours) in the constant temperature bath and standing at room temperature during the day was repeated successively thereafter at 90°, 100° and at 110° C. or until the composition was found (on morning inspection) to have become a colloidal, latex-like dispersion, in which case that run was terminated.

In one group of runs in the series, aqueous ammonia was selected and the concentration was adjusted to provide five equivalents of ammonia per acid equivalent of the starting polymer. In a second group of runs, concentrated ammonium hydroxide (28% ammonia) was used.

Two starting polymers were used: one was a binary copolymer of 85.1% ethylene and 14.9% acrylic acid having a melt flow value of 2 grams per 10 minutes at 190° C. under 2160 grams load; the other was a ternary copolymer of 65.9% ethylene, 15.7% ethyl acrylate, and 18.4% acrylic acid having a melt indexer value of 16.4 grams per 100 minutes at 190° C. under 325 grams load.

The visual appearance and remarks pertaining to these runs are set out in Tables IX and X below, wherein the temperatures are those of the respective baths used in the sequence described above.

TABLE IX

| Binary copolymer | 5 equivalents of NH₃ | 28% NH₃ |
| --- | --- | --- |
| After treatment at— | | |
| 75° C | Pellets swollen | Pellets swollen. |
| 80° C | Pellets swollen and whitened. | Pellets greatly swollen with some fragments. |
| 90° C | Greater swelling | Colloidal dispersion with sediment; terminated. |
| 100° C | More swelling fragmentation. | |
| 110° C | Colloidal dispersion | |

TABLE X

| Ternary copolymer | 5 equivalents of NH₃ | 28% NH₃ |
| --- | --- | --- |
| After treatment at— | | |
| 75° C | Pellets whitened | Pellets whitened and swollen. |
| 80° C | do | Pellets swollen and fragmented. |
| 90° C | Pellets whitened and swollen. | Colloidal dispersion with sediment; terminated. |
| 100° C | Pellets swollen and fragmented. | |
| 110° C | Colloidal dispersion | |

The above tests show how the starting acid polymer pieces change as they spontaneously convert to colloidal dispersion. They also show that, in the case of aqueous ammonia as the alkaline medium, digestion in concentrated ammonium hydroxide effects dispersion at a temperature lower (by about 20° C.) than that required for dispersion of this kind of polymer in dilute aqueous ammonia.

EXAMPLE 21

In a series of tests of various bases, 10-gram portions of a starting polymer in the form of molding granules were placed in 12-ounce citrate bottles with 90-grams of water and amounts of base shown in Table XI. The polymer was a random ternary copolymer of ethylene 72%, ethyl acrylate 14%, and acrylic acid 14% with a melt flow value of 8 grams per 100 minutes. The bottles were sealed with non-corrosive caps, placed in a heated tumbler bath of ethylene glycol at 125° C., and therein heated and slowly tumbled for 16 hours. After cooling the bottles, the contents were examined and the results are shown in Table XI. In that table are identified the kind of base and the amount thereof expressed as equivalents of base per equivalent of acid group in the copolymer charged.

TABLE XI

| Base | | Product |
| --- | --- | --- |
| Kind | Equivalents | |
| Ethanolamine | 2 | Latex dispersion. |
| Do | 4 | Do. |
| Di-isopropanolamine | 2 | Swollen granules. |
| Do | 4 | Opaque latex dispersion. |
| Morpholine | 4 | Latex plus swollen pellets. |
| Do | 6 | Latex plus gel residue. |
| Do | 8 | Opaque latex. |
| Do | 10 | Latex dispersion. |
| Do | 20 | Do. |
| Piperazine | 2 | Do. |
| Do | 4 | Do. |
| Ethylene diamine | 2 | Do. |
| Do | 4 | Do. |
| Methyl amine | 2 | Do. |
| Do | 4 | Do. |
| Triethyl amine | 2 | Do. |
| Do | 4 | Do. |
| Diethyl amine | 2 | Do. |
| Do | 4 | Do. |
| Lithium hydroxide | 0.5 | Do. |
| Do | 1 | Do. |
| Do | 2 | Do. |
| Cesium hydroxide | 0.5 | Do. |
| Do | 1 | Do. |

EXAMPLE 22

In a manner described in Example 21, 10-gram portions of a different starting copolymer were digested in aqueous tetramethylammonium hydroxide. The starting copolymer was a solid random binary copolymer of 92% ethylene and 8% acrylic acid. The amount of base as equivalents thereof per acid equivalent of the polymer and the results observed in the product are shown in Table XII.

TABLE XII

| Trimethylammonium hydroxide base | Product |
| --- | --- |
| 0.25 equivalent | Opaque latex, suspended solids. |
| 0.5 | Translucent latex. |
| 1.0 | Do. |

EXAMPLE 23

In this example 20-gram portions of a solid random copolymer of 95% styrene/5% acrylic acid and a solid random copolymer of 95% styrene/5% methacrylic acid were placed in 12-ounce citrate bottles with 200 grams of 10% aquous triethylamine. The bottles were closed and tumbled at 120° C. for 16 hours in a heating bath in a manner described in Example 21. Viscous latex dispersions were obtained in each case.

It can be mentioned that these copolymers did not disperse in aqueous 28% ammonia under these same conditions.

EXAMPLE 24

This example demonstrates one kind of utility for these latex dispersions.

A latex dispersion was made by digesting in hot aqueous ammonia and in a manner hereinbefore described a solid random compolymer of 88.8% ethylene and 11.2% acrylic acid having a melt flow value of 8 grams per 10 minutes. The latex dispersion product had pH 9.4, 21% solids content, and viscosity (Brookfield viscometer) 40 cps. with No. 2 spindle at 20 r.p.m.

A paper-coating slurry was prepared from 10.5 parts of the latex dispersion just described, 100 parts of Hydrafine clay (paper coating grade), and water to make 57.5% total solids in the slurry, which then had pH 7.0. This slurry was then applied to 51 lb. bleached sulfite paper at a coating weight of 15 lbs. per book ream using a No. 7 Meyer wire-wound rod. The coated paper was dried at 220° F. for 2 minutes and calendered between rolls (6 nips).

Another paper-coating slurry was prepared from a standard commercial paper-coating latex of styrene/butadiene copolymer and the same clay, and such slurry was applied to the same grade of paper and treated in the same fashion as just described, After conditioning at 50% RH and 75° F. according to TAPPI Method T-402, representative specimens of the resulting coated papers were tested using conventional coated paper test methods with results shown in Table XIII.

TABLE XIII.—PROPERTIES OF COATING COMPOSITIONS AND RESULTING COATED PAPER

| Property | Ethylene acrylic acid latex | Standard S/B latex | TAPPI method |
|---|---|---|---|
| Viscosity* | 350 | 75 | |
| Dry pick (IGT) | 390 | 310 | T-499 |
| 75° gloss: | | | |
| Original | 26 | 24 | RC-248 |
| Calendered | 49 | 49 | RC-248 |
| Brightness | 79 | 78.5 | T-452 |
| K and N ink test, percent drop | 38 | 30 | RC-19 |
| Wet rub | Trace | Trace | RC-185 |

In like manner as hereinbefore described, aqueous colloidal dispersions are made from other normally solid, water- and alkali-insoluble thermoplastic polymers containing acid groups in the polymer structure by digesting small non-colloidal pieces thereof in aqueous alkaline media as an enveloping phase.

The latexes and aqueous colloidal dispersions so prepared are useful in various ways evident to the artisan. They are particularly useful in treating, coating or impregnating fibrous and porous substrates and materials, such as paper, felts, cloth and other fabrics, wood and the like, by dipping, brushing, rolling, spraying, padding or other means, usually followed by drying and perhaps by heating. For example, paper coated or impregnated with one of the latex products made as described above, dried and heated on hot rolls or in an oven, is thereby strengthened and rendered more resistant to abrasion and to oils and solvents. In some instances a layer or coating of dried residue from a latex on paper or other substrates impart heat seal properties thereto.

Latexes made as above described by digestion in aqueous ammonia, or in aqueous solutions of volatile amines lose both water and volatile base on drying of a thin film or layer. The resulting residue tends to revert to the acid form of the starting polymer. For example, the ammoniacal latex of digestion of an ethylene/acrylic acid copolymer in aqueous ammonia, when dried as a thin layer, loses both water and ammonia and deposits a dried film of the ethylene/acrylic acid copolymer. The resulting ethylene/acrylic acid copolymer layer is highly adherent to many substrates such as paper, glass, metal, and many plastics, and in turn accepts, with formation of strong bond thereto, super-imposed layers of other coating materials, plastics, diverse laminae, ink, etc. Articles coated in this manner with ethylene/acrylic acid copolymer are advantageously resistant to moisture, gasoline, oil and greases.

What is claimed is:

1. A method for making an aqueous colloidal dispersion of a normally solid, water- and alkali-insoluble, thermoplastic, organic, addition copolymer of non-acid, ethylenically unsaturated polymerizable monomer and from about 8 to about 30 weight of an ethylenically unsaturated carboxylic acid, said method comprising digesting a non-colloidal mass of the copolymer in admixture with at least an equal volume of a continuous and enveloping phase of alkaline aqueous liquid medium containing a base at least as basic as ammonia and in an amount of at least 0.2 equivalent of base per acid group in the copolymer, said digestion being carried out in the absence of emulsifier whereby the copolymer spontaneously converts into colloidal particles in the aqueous medium.

2. The method of claim 1 wherein the enveloping alkaline aqueous liquid medium is an aqueous solution comprising an alkali metal hydroxide.

3. The method of claim 1 wherein the enveloping alkaline aqueous liquid medium is an aqueous solution comprising ammonia.

4. The method of claim 1 wherein the non-acid, ethylenically unsaturated polymerizable monomer is selected from the group consisting of aliphatic olefin, aromatic olefin, unsaturated ester, vinyl and vinylidene chloride, vinyl ether, acrylamide and acrylonitrile.

5. A method for making an aqueous colloidal dispersion of a normally solid water- and alkali-insoluble copolymer of aliphatic olefin and from about 8 to about 30 percent by weight of an ethylenically unsaturated carboxylic acid, said method comprising digesting the copolymer in the form of non-colloidal pieces in admixture with at least an equal volume of a continuous and enveloping phase of alkaline aqueous liquid medium containing a base at least as basic as ammonia and in an amount of at least 0.2 equivalent of base per acid group in the copolymer, said base selected from the group consisting of alkali metal hydroxide, ammonia, mono-, di- and tri-methyl amine, -ethylamine, -isopropylamine and -isobutylamine, cyclohexylamine, and tetramethylammonium hydroxide, said digestion being carried out in the absence of emulsifier and at a temperature in the range from about 90° C. to about 160° C. for a period from about 15 minutes to about 21 hours, whereby the polymer spontaneously converts into colloidal particles in the aqueous medium.

6. The method of claim 5 carried out by digesting one part by weight of a binary copolymer of ethylene and from about 10 to about 30 percent per weight of acrylic acid in the granular form in from 1 to 20 parts by weight of aqueous potassium hydroxide solution containing from about 0.5 to about 1 equivalent of potassium hydroxide per carboxylic acid group in the polymer.

7. The method of claim 1 which comprises digesting molded pellets of a copolymer of ethylene and from about 8 to about 30 percent by weight of an ethylenically unsaturated carboxylic acid selected from the group consisting of acrylic acid, methacrylic acid, maleic acid and anhydride, itaconic acid, fumaric acid, citraconic acid and anhydride and methyl hydrogen maleate in an admixture with at least an equal volume of a continuous and enveloping phase of alkaline aqueous liquid medium containing a base selected from the group consisting of ammonia, alkali metal hydroxide, tri-ethylamine, ethanolamine, di-isopropanolamine, morpholine, piperazine, ethylene diamine, methyl amine, diethylamine, tetramethyl ammonium hydroxide in an amount of at least 0.2 equivalent of base per acid group in the polymer, said digestion being carried out in the absence of emulsifier, whereby the copolymer spontaneously converts into colloidal particles in the aqueous medium.

8. The method of claim 5 wherein the copolymer is a ternary copolymer of ethylene, up to about 20 percent by weight of ethyl acrylate, and from about 10 to about 20 percent by weight of acrylic acid.

9. The method of claim 5 carried out by digesting one part by weight of the copolymer in from 1 to 20 parts by weight of aqueous ammonia per carboxylic acid group in the copolymer.

10. The method of claim 9 wherein the copolymer is a ternary copolymer of ethylene, from about 10 to about 20 percent by weight of ethyl acrylate, and from about 10 to about 20 percent by weight of acrylic acid.

11. The method of claim 9 wherein the copolymer is a ternary copolymer of ethylene, from about 10 to about 20 percent by weight of ethyl acrylate, and from about 10 to about 20 percent by weight of acrylic acid.

12. The method of claim 1 wherein the polymer is a copolymer of ethylene and from about 10 to about 30 percent by weight of methacrylic acid.

13. The method of claim 1 wherein the polymer is a copolymer of ethylene and from about 10 to about 30 percent by weight of methyl hydrogen maleate.

14. The method of claim 1 wherein the polymer is a copolymer of styrene and from about 10 to about 30 percent by weight of maleic anhydride.

15. The method according to claim 1 which comprises digesting a non-colloidal mass of said polymer in admixture with at least an equal volume of a continuous and enveloping phase of alkaline aqueous liquid medium up to about 20 parts by weight of medium per part by weight of polymer, said medium containing a base at least as basic as ammonia and in amount of at least 0.2 up to about 20 equivalents of base per acid group in the polymer, the mixture of polymer and medium being free of solvent for the polymer, said digestion being carried out in the absence of emulsifier whereby the non-colloidal massive polymer spontaneously converts into colloidal particles in the aqueous medium.

16. The method of claim 1 wherein (a) said copolymer is selected from the group consisting of random copolymers of at least one of acrylic acid, methacrylic acid, maleic acid and anhydride, itaconic acid, fumaric acid, citraconic acid and anhydride, and methyl hydrogen maleate and at least one of aliphatic olefin, aromatic olefin, unsaturated ester, vinyl and vinylidene chloride, vinyl ether, acrylamide, and acrylonitrile; (b) a non-colloidal mass is in the form of non-colloidal granules, chips, bits or pieces resulting from grinding, or molded beads, pills or pellets consisting essentially of said polymer; (c) the base is selected from the group consisting of alkali metal hydroxide, ammonium hydroxide, mono-, di- and tri-methylamine, mono-, di- and tri-ethylamine, mono-, di- and tri-isopropylamine, mono-, di- and tri-isobutylamine, cyclohexylamine, morpholine, ethanolamine, di-isopropanolamine, piperazine, ethylene diamine, and tetramethylammonium hydroxide; and (d) said temperature is in the range from about 90° to about 160° C.

17. The method of claim 16 wherein said copolymer is selected frrom the group consisting of (1) random copolymers of ethylene and from about 8 to about 30 weight percent of at least one ethylenically unsaturated carboxylic acid, (2) random copolymers of ethylene, from about 8 to about 30 weight percent of at least one ethylenically unsaturated carboxylic acid and up to about 20 weight percent of at least one other monomer copolymerizable therewith, said other monomer selected from the group consisting of ethylene, propylene, butene-1, 1,3-butadiene, styrene, α-methylstyrene, vinyltoluene, chlorostyrene, ethyl acrylate, methyl methacrylate, vinyl acetate, vinyl chloride, vinylidene chloride, acrylamide and acrylonitrile, and (3) random copolymers of ar-vinyl aromatic compound and from about 8 to about 30 weight percent of at least one ethylenically unsaturated carboxylic acid, said carboxylic acid selected from the group consisting of acrylic acid, methacrylic acid, maleic acid and anhydride, itaconic acid, fumaric acid, citraconic acid and anhydride, and methyl hydrogen maleate and said base is selected from the group consisting of ammonium hydroxide, alkali metal hydroxide, mono-, di- and tri-methylamine, mono-, di- and tri-ethylamine, mono-, di- and tri-isopropylamine, mono-, di- and tri-isobutylamine, cyclohexylamine and tetramethylammonium hydroxide.

18. The method of claim 16 wherein said (a) copolymer is selected from the group consisting of ethylene/acrylic acid copolymers, ethylene/methacrylic acid copolymers, ethylene/itaconic acid copolymers, ethylene/methyl hydrogen maleate copolymers, ethylene/maleic acid copolymers, ethylene/acrylic acid/methyl methacrylate copolymers, ethylene/acrylic acid/ethyl acrylate copolymers, ethylene/methacrylic acid/ethyl acrylate copolymers, ethylene/itaconic acid/methyl methacrylate copolymers, ethylene/methyl hydrogen maleate/ethyl acrylate copolymers, ethylene/acrylic acid/vinyl acetate copolymers, ethylene/methacrylic acid/vinyl acetate copolymers, ethylene/acrylic acid/vinyl alcohol copolymers, ethylene/propylene/acrylic acid copolymers, ethylene/acrylamide/acrylic acid copolymers, ethylene/styrene/acrylic acid copolymers, ethylene/methacrylic acid/acrylonitrile copolymers, ethylene/fumaric acid/vinyl methyl ether copolymers, ethylene/vinyl chloride/acrylic acid copolymers, ethylene/vinylidene chloride/acrylic acid copolymers, polyethylene/acrylic acid graft copolymers, polyethylene/methacrylic acid graft copolymers, polymerized ethylene/propylene/acrylic acid graft copolymers, styrene/acrylic acid copolymers, styrene/methacrylic acid copolymers, styrene/itaconic acid copolymers, styrene/methyl methacrylate/acrylic acid copolymers, styrene/maleic anhydride copolymers, styrene/citraconic anhydride copolymers, ar-chloro-styrene/acrylic acid copolymers, ar-t-butylstyrene/acrylate acid copolymers, methyl methacrylate/isobutyl acrylate/acrylic acid copolymers; (b) said noncolloidal mass is in the form of non-colloidal granules, chips, bits or pieces resulting from grinding, or molded beads, pills or pellets consisting essentially of said polymer; and (c) said base is selected from the group consisting of alkali metal hydroxide, ammonium hydroxide, mono-, di- and tri-methylamine, mono-, di- and tri-ethylamine, mono-, di- and tri-isopropylamine, mono-, di- and tri-isobutylamine, cyclohexylamine, morpholine, ethanolamine, di-isopropanolamine, piperazine, ethylene diamine, and tetramethylammonium hydroxide.

References Cited

UNITED STATES PATENTS

| | | |
|---|---|---|
| 3,347,811 | 10/1967 | Bissot. |
| 3,364,164 | 1/1968 | Lyons. |
| 3,389,109 | 6/1968 | Harmon et al. |
| 3,485,785 | 12/1969 | Anspon. |
| 3,677,989 | 7/1972 | Jenkinson. |
| 3,232,899 | 2/1966 | Guziak _____ 260—29.6 TA |
| 3,296,170 | 1/1967 | Burkhart et al. __ 260—29.6 OL |
| 2,962,465 | 11/1960 | Lindstrom et al. _ 260—29.6 TA |

MELVIN GOLDSTEIN, Primary Examiner

U.S. Cl. X.R.

117—124 E, 132 C, 138.8 A, 140 A, 148, 155 A; 260—29.6 H, TA, 29.7 H

UNITED STATES PATENT OFFICE
CERTIFICATE OF CORRECTION

Patent No. 3,799,901　　　　　　　　Dated March 26, 1974

Inventor(s)　Gordon D. McCann et al

It is certified that error appears in the above-identified patent and that said Letters Patent are hereby corrected as shown below:

Column 1, line 18, the word "oragnic" should be --organic--.

Column 2, line 12, the word "desicrebd" should be --described--

Column 2, line 32, the word "amonut" should be --amount--.

Column 2, line 36, the word --metal-- should appear between "alkali" and "hydroxides".

Column 4, line 8, change "fro mabout" to read --from about--.

Column 9, line 37, "result" should be --resulted--.

Column 10, line 30, the word "the", second occurrence, should read -- this --.

Column 11, line 13, the number "72.7%" should be --73.7%--.

Column 11, line 31, the word "maner" should be --manner--.

Column 13, line 34, last column under the heading "Green Line", the number "1,751" should be --1715--.

Column 15, line 68, the figure "100" should be --10--.

Column 16, line 45, the word "aquous" should --aqueous--.

Column 16, line 57, the word "compolymer" should be --copolymer·

Column 19, line 34, the word "frrom" should be --from--.

Signed and sealed this 22nd day of October 1974.

(SEAL)
Attest:

McCOY M. GIBSON JR.　　　　　　　C. MARSHALL DANN
Attesting Officer　　　　　　　　Commissioner of Patents